//2,850,522
Patented Sept. 2, 1958

2,850,522

STABILIZATION OF UNSATURATED NITRILES

Bobbie D. Stone, Miamisburg, and Forrest V. Williams, Dayton, Ohio, assignors to Monsanto Chemical Company, St. Louis, Mo., a corporation of Delaware No Drawing. Application February 28, 1957
Serial No. 643,200

8 Claims. (Cl. 260—465.9)

This invention relates to the stabilization of unsaturated nitriles. More specifically, this invention relates to the inhibition of the polymerization of alpha, beta-unsaturated nitriles.

The unsaturated nitriles, particularly the alpha, beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techniques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminants.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the system. To add to those latter problem, impurities present in crude unsaturated nitriles are frequently of the type which accelerate polymerization. For example, acrylonitrile containing small quantities of acetaldehyde exhibits a greater tendency to polymerize than does relatively pure acrylonitrile.

Attempts to eliminate this problem have been made in the past by the addition of inhibitors which retard or prevent the polymerization of unsaturated nitriles. Unfortunately, the inhibitors heretofore used, while exhibiting some inhibitory effects, have not proven to be completely satisfactory. To be of practical utility, the inhibitor must not impart any undesirable color to the unsaturated nitrile, be sufficiently inhibitory to manifest its effect over extended periods of storage, inhibit polymer formation at elevated temperatures to permit utility in distillation purification techniques and be readily separable from the unsaturated nitrile or inert in subsequent reactions of the inhibited product. The inhibitors heretofore used have not satisfied all of these requirements.

It is an object of this invention to provide an improved method for preventing or inhibiting the polymerization of unsaturated nitriles. It is a further object of this invention to provide an improved method for preventing the polymerization of unsaturated nitriles by the addition of an inhibitor which does not possess the deficiencies exhibited by the inhibitors heretofore used. A still further object of this invention is to provide novel, stabilized compositions comprising an unsaturated nitrile and an added polymerization inhibitor, which then can be subjected to extended periods for storage or distillation at elevated temperatures without exhibiting any significant evidence of polymer formation. Further objects of this invention will become apparent from the description which follows.

It has been discovered that the polymerization of unsaturated nitriles, particularly the alpha, beta-unsaturated nitriles, can be successfully inhibited by mixing therewith a minor amount of cyclotetrathiotetraimine having the structural formula:

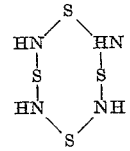

It has been found that a composition comprising an unsaturated nitrile and a minor amount of cyclotetrathiotetraimine will inhibit any significant polymer formation in prolonged periods of storage or when subjected to temperatures commonly encountered during purification by distillation techniques.

Samples of acrylonitrile, methacrylonitrile, crotonitrile, α-ethylacrylonitrile, β-hexyl acrylonitrile, α,β-dimethyl acrylonitrile, α-furfuryl acrylonitrile, β-butyl acrylonitrile, β-(2-chloroethyl) acrylonitrile, β-ethylacrylonitrile, α-naphthyl acrylonitrile, α-(2-chlorobutyl) acrylonitrile and α-(4-hydroxy phenyl) acrylonitrile are stabilized by mixing therewith about 100 parts by weight of cyclotetrathiotetraimine per million parts of the nitrile. After extended periods of storage at atmospheric temperatures, no significant discoloration of polymer formation is evident in these samples.

Substantial variation of the proportion of the inhibition is possible without departing from the scope of the invention. For example, the quantity of the cyclotetrathiotetraimine used to inhibit the polymerization of the unsaturated nitrile can be varied widely, depending upon the particular nitrile to be stabilized and the degree of inhibition desired. An advantage of cyclotetrathiotetraimine in such application as this is the fact that it can be used in extremely small quantities due to its strong inhibitory qualities. Concentration in the range of from about 0.1 to about 2,000 parts by weight or preferably from about 1 to about 1,500 parts by weight of cyclotetrathiotetraimine per million parts of the nitrile are highly preferred. These low concentrations afford adequate stability for most applications and greatly simplify subsequent processing of the nitrile. Of course, higher concentrations of the inhibitor in the nitrile can be used if desired, resulting in a nitrile monomer even more strongly inhibited against polymerization.

Cyclotetrathiotetraimine can be used to stabilize unsaturated nitriles and mixtures of the same with other monomers under any type of conditions. Thus, it can be used under atmospheric conditions of light, air, temperature and pressure and during purification of the crude nitrile monomer. To inhibit polymer formation during distillation of the unsaturated nitrile, the inhibitor can be added to the feed stream to the column. Preferably, the inhibitor is introduced at the top of the column to provide maximum inhibition throughout the entire system.

The alpha, beta-unsaturated nitriles, represented by the formula:

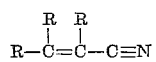

wherein the R's are the same or different and selected from the group consisting of hydrogen and alkyl radicals containing from 1 to 8 carbon atoms, respond readily to the stabilizing effect of the inhibitor disclosed herein. Acrylonitrile, alpha-substituted acrylonitriles, wherein the substituent on the alpha carbon atom is an alkyl radical containing from 1 to 8 carbon atoms, represent a class of monomers which polymerize very readily, but can be most effectively inhibited against polymerization by means of cyclotetrathiotetraimine.

When desired separation of cyclotetrathiotetraimine from the stabilized unsaturated nitrile monomer can be accomplished by any of a variety of simple techniques, for example, it can be extracted by means of a suitable solvent. Preferably, however, the unsaturated nitrile is distilled from the inhibited compositions.

The following examples illustrate specific embodiments of the invention:

Example 1

An elongated polymerization tube was charged with 35 ml. of freshly distilled styrene and 5 ml. of freshly distilled acrylonitrile together with 0.05 gram of lauroyl peroxide. The tube was flushed with argon and was then sealed off in order to prevent the access of oxygen. The tube containing the monomers was then placed in an oil bath maintained at 76° C. After two days the monomers were examined and were found to be polymerized to a solid polymer.

Example 2

A polymerization was conducted similarly to that of Example 1 but with the addition of 1,300 p. p. m. of cyclotetrathiotetraimine. It was found that the monomers in this experiment did not polymerize but remained liquid without any apparent increase in viscosity.

What is claimed is:

1. A composition comprising an alpha, beta unsaturated nitrile selected from the group consisting of acrylonitrile, the alpha-substituted acrylonitrile wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, containing cyclotetrathiotetraimine in an amount of from about 0.1 to about 2,000 parts by weight per million parts by weight of nitrile.

2. A composition comprising an alpha, beta-unsaturated nitrile containing cyclotetrathiotetraimine in an amount of from about 0.1 to about 2,000 parts by weight per million parts by weight of nitrile.

3. A composition comprising an alpha, beta-unsaturated nitrile containing cyclotetrathiotetraimine in an amount from about 1 to about 1,500 parts by weight per million parts by weight of nitrile.

4. A composition comprising an alpha, beta unsaturated nitrile selected from the group consisting of acrylonitrile, the alpha-substituted acrylonitrile wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, containing cyclotetrathiotetraimine in an amount from about 1 to about 1,500 parts by weight per million parts by weight of nitrile.

5. A process for inhibiting the polymerization of alpha, beta-unsaturated nitriles which comprises mixing therein cyclotetrathiotetraimine in an amount from about 0.1 to about 2,000 parts by weight per million parts by weight of nitrile.

6. A process for inhibiting the polymerization of an alpha, beta unsaturated nitrile selected from the group consisting of acrylonitrile, the alpha-substituted acrylonitrile wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms, which comprises mixing therein cyclotetrathiotetraimine in an amount from about 0.1 to about 2,000 parts per million parts by weight of nitrile.

7. A process for inhibiting the polymerization of alpha, beta-unsaturated nitriles which comprises mixing therein cyclotetrathiotetraimine in an amount from about 1 to about 1,500 parts by weight per million parts by weight of nitrile.

8. A process for inhibiting the polymerization of an alpha, beta unsaturated nitrile selected from the groups consisting of acrylonitrile, the alpha-substituted acrylonitrile wherein the substituent on the alpha carbon is an alkyl radical containing from 1 to 8 carbon atoms, and the beta-substituted acrylonitrile wherein the substituent on the beta carbon atom is an alkyl radical containing from 1 to 8 carbon atoms, which comprises mixing therein cyclotetrathiotetraimine in an amount from about 1 to about 1,500 parts by weight per million parts by weight of nitrile.

No references cited.